United States Patent
Ozawa et al.

(10) Patent No.: US 7,014,950 B2
(45) Date of Patent: Mar. 21, 2006

(54) LEAD OUTLET STRUCTURE OF SECONDARY BATTERY IN SHEET TYPE

(75) Inventors: Kazunori Ozawa, Tokyo (JP); Takao Takasaki, Tokyo (JP); Naoko Fujiya, Tokyo (JP); Shinichi Konno, Yonezawa (JP)

(73) Assignee: Enax, Inc., Tokyo (JP)

( * ) Notice: Subject to any disclaimer, the term of this patent is extended or adjusted under 35 U.S.C. 154(b) by 230 days.

(21) Appl. No.: 10/429,883

(22) Filed: May 6, 2003

(65) Prior Publication Data

US 2004/0224227 A1 Nov. 11, 2004

(51) Int. Cl.
*H01M 2/30* (2006.01)

(52) U.S. Cl. ............... 429/187; 429/170; 429/184
(58) Field of Classification Search ........... 429/162, 429/180–181, 170, 184, 187
See application file for complete search history.

(56) References Cited

U.S. PATENT DOCUMENTS

| | | | |
|---|---|---|---|
| 5,419,982 A * | 5/1995 | Tura et al. | 429/162 |
| 6,458,483 B1 | 10/2002 | Hamano et al. | |
| 6,703,162 B1 * | 3/2004 | Shiota et al. | 429/185 |
| 6,743,546 B1 * | 6/2004 | Kaneda et al. | 429/127 |

FOREIGN PATENT DOCUMENTS

| | | |
|---|---|---|
| EP | 0 973 212 A1 | 1/2000 |
| JP | 59-71254 A | 4/1984 |
| JP | 63-174265 A | 7/1988 |
| JP | 2000-133220 A | 5/2000 |
| JP | 2001-229924 A | 8/2001 |
| JP | 2003-151529 A | 5/2003 |
| WO | WO 98/42036 A1 | 9/1998 |

OTHER PUBLICATIONS

Naoko Fujiya et al., Proceedings of Workshop on Solar & Electric Vehicle, Feb. 24, 2002.
Kazunori Ozawa et al., Proceedings of the 19th International Seminar & Exhibit on Primary & Secondary Batteries, Mar. 11-14, 2002.

* cited by examiner

*Primary Examiner*—Mark Ruthkosky
(74) *Attorney, Agent, or Firm*—Birch, Stewart, Kolasch & Birch, LLP

(57) ABSTRACT

The present invention is a lead outlet structure of a secondary battery in sheet type, which comprises; an internal electrode pair in sheet type which is obtained by stacking alternately sheets of cathode electrode and sheets of anode electrode with separator between them, a flexible envelope form package that contains inside hermetically this internal electrode pair and electrolyte, a pair of internal leads that are respectively connected with separately each of cathode electrode and each of anode electrode of the internal electrode pair inside the envelope form package, a pair of external leads that are provided on the outside of the above-mentioned envelope form package corresponding to each of the above-mentioned internal leads with the above-mentioned envelope form package in between, and a pair of connecting means, one side of which is connected to each of the internal leads inside the above-mentioned envelope form package and the other side is connected to each of the external leads on the outside of the envelope form package as well so that each of the internal leads and each of the external leads are electrically connected, and which is light, thin and flexible, and is capable to be a compact and light weight product and can attain a relatively large capacity secondary battery.

7 Claims, 3 Drawing Sheets

LEAD OUTLET STRUCTURE OF SECONDARY BATTERY IN SHEET TYPE

BACKGROUND OF THE INVENTION

1. Field of the Invention

The present invention relates to a lead outlet structure of secondary battery in sheet type. For example, the present invention relates to, it is not limited to them though, a lead outlet structure of a large capacity secondary battery in sheet type for an electric vehicle, a UPS (uninterrupted power supply) a road leveling and so on.

2. Description of the Related Art

One of secondary batteries that have higher capacity or more energy per volume or weight and have higher energy density is, for example, a lithium ion rechargeable battery that is a secondary battery with non-aqueous electrolyte, is composed of lithium or lithium alloy. This lithium ion battery has advantages such as no memory effect, little self-discharge and so on, therefore, it is widely used for video camera recorders, audio equipment, portable computers, mobile phones, various electric equipment, communication devices, optical equipment and audio equipment.

This lithium ion secondary battery generally composes of an electrode pair, a battery housing which encloses this electrode pair and seals inside with electrolyte, and a cathode lead and an anode lead those are connected from each of cathode electrode and anode electrode of the electrode pair to each of cathode terminal and anode terminal which are incorporated on the battery housing, where the electrode pair consists of sheets of cathode electrode that consists of a sheet of cathode collector and cathode active material coated on it, sheets of anode electrode that consists of a sheet of anode collector and anode active material coated on it and a separator that is stacked between them.

During charging, a lithium goes out of cathode active material and gets into electrolyte as an ion, then gets into anode active material, while during discharging, this lithium ion gets out of anode material and gets into electrolyte and goes back into cathode material.

Since it can accomplish its high energy density, lithium ion secondary battery like this is expected to use, for example, as a large capacity secondary battery for electric vehicle use. And a plenty of development and proposal have been conducted in this area so far.

Not only relatively small secondary batteries used for electric equipment, communication devices, optical equipment, audio devices and so on, but also larger secondary batteries for electric vehicles, are requested to be smaller in size, lighter in weight, thinner in thickness and free in shape.

Therefore, conventionally in regard of a battery housing, a flexible envelope form package of three layer laminated film that is composed of an inner layer of thermoplastic resin such as polyethylene or polypropylene which are stable with electrolyte and suitable for heat-sealing, a middle layer of metal foil that is flexible and strong such as aluminum foil and an external layer of insulating resin such as polyamide resin, which shows good electrical insulation.

Light, thin, and flexible lithium ion secondary batteries in sheet type are proposed to be obtained by inserting an internal electrode pair in sheet type and electrolyte into the above-mentioned envelope form package.

And as indicated in FIG. 5 and FIG. 6, this conventional lithium ion secondary battery in sheet type B consists of an internal electrode pair 1 in sheet type that is generally composed of cathode electrode 1a in sheet type, anode electrode 1b in sheet type and separator 1c stacked between them and a flexible envelope form package 2 that is made of laminated film which has an internal layer 2a of thermoplastic resin, a middle layer 2b of metal foil and an external layer 2c of insulating resin, which contains the above-mentioned internal electrode pair 1 and electrolyte inside. And also inside this envelope form package 2, each of cathode electrode 1a and each of anode electrode 1b are connected to a pair of cathode lead 3a and anode lead 3b, respectively. In addition, this pair of cathode lead 3a and anode lead 3b goes hermetically through heat sealed portion 4 of the envelope form package 2 and is fixed to this heat sealed portion. And the projected external portions of the cathode lead 3a and anode lead 3b out of the heat sealed portion 4 are used as terminals or external leads.

In this structure of electrode leads, the surface between the envelope from package 2, the cathode lead 3a and the anode lead 3b, which are extended, as external leads or terminals, to the outside of the envelope form package 2 is adhered by heat-sealing of inner layer 2a of thermoplastic resin of the envelope form package 2. And adhesion strength between these cathode lead 3a and anode lead 3b and an envelope form package 2 is not sufficient, especially the larger the capacity becomes, the heavier the cell becomes inevitably, consequently adhesion between a cathode lead 3a and an anode lead 3b, and an envelope form package 2 becomes unreliable with heat seal only. And if material of a cathode lead 3a is aluminum as in normal case, the adhesion strength on this aluminum cathode lead 3a becomes more unreliable, then heat sealed portion between the cathode lead 3a and the envelope form package 2 may have an opening and in some cases, water may go inside through this opening and may produce hydrogen fluoride, then the battery may deteriorate or the electrolyte may go out of the envelope form package 2.

Moreover, when capacity becomes larger and as a result large drain is desired, the section area of leads that is conducted from the inside electrode pair (cathode electrode and anode electrode) through the envelope form package to the outside is also required to be large. Then the larger this section area is, the more frequently the above-mentioned problems occur. For this reason a sheet type lithium ion battery in an envelope form package with capacity of more than 3 Ah is considered to be difficult to achieve, although it is expected to contribute to smaller or lighter equipment, machines, or automobiles with these lighter, thinner, flexible and versatile characteristics.

SUMMARY OF THE INVENTION

Then after the inventors of the present invention examined wholeheartedly lead outlet structures of electrode which can construct a relatively large capacity, preferably more than 5 Ah, batteries without spoiling advantages such as light, thin, flexible characteristics as secondary batteries in sheet type have, using an envelope form package of three layer laminated film like this, they completed the present invention by finding that an envelope form package between each of the internal leads and the external leads are fixed firmly and hermetically by connecting between the pair of internal leads that is respectively connected to each of the cathode electrode and the anode electrode of the electrode pair inside the envelope form package and the pair of the external leads provided on the outside surface of the envelope form package, through the envelope form package by a pair of connecting means, whose one end is connected to each of the internal leads inside the envelope form package and the other end at the same time is connected to each of the external leads outside the envelope form package, and by electrically connecting each of the internal leads and each of the external leads by this pair of connecting means.

Hence, an objective of the present invention is to provide a lead outlet structure of a secondary battery in sheet type, which accomplishes a relatively large capacity secondary battery as a secondary battery in sheet type, which uses an envelope form package as a battery housing and at the same time it can be light, thin and flexible The present invention is a lead outlet structure of secondary battery in sheet type, which comprises; an internal electrode pair in sheet type which is obtained by stacking alternately sheets of cathode electrode and sheets of anode electrode with separator between them, a flexible envelope form package that contains inside hermetically this internal electrode pair and electrolyte, a pair of internal leads that are respectively connected with separately each of cathode electrode and each of anode electrode of the internal electrode pair inside the envelope form package, a pair of external leads that are provided on the outside of the above-mentioned envelope form package corresponding to each of the above-mentioned internal leads with the above-mentioned envelope form package in between, and a pair of connecting means, one side of which is connected to each of the internal leads inside the above-mentioned envelope form package and the other side is connected to each of the external leads on the outside of the envelope form package as well so that each of the internal leads and each of the external leads are electrically connected.

An envelope form package in the present invention is not limited to something special, as far as it has practical strength to be a battery housing of a secondary battery in sheet type and at the same time it is stable with electrolyte that is contained inside. One example is a flexible envelope form package that has three layer laminated film that consists of; an internal layer of thermoplastic resin that are stable with electrolyte and suitable for heat-sealing, for example, polyethylene, polypropylene, polystyrene, polyamide, ionomer and so on, an middle layer of metal foil that is flexible and strong, for example, aluminum foil, stainless steel foil and so on and an external layer of insulating resin that has good electrical insulation, for example, polyamide system resin, polyester system resin and so on.

And in this invention inside the above-mentioned envelope form package, each of cathode electrode sheets of an internal electrode pair are connected by cathode internal leads and at the same time each of anode electrode sheets are connected by anode internal leads. And also each of external leads for cathode and anode are provided on the position on the outside of the envelope form package corresponding to the above-mentioned internal cathode and anode leads and a pair of connecting means that goes hermetically through the envelope form package connects electrically between the internal cathode lead and the external cathode lead and between the internal anode lead and the external anode lead.

The size of the above-mentioned internal leads and external leads is designed to the capacity, volume, weight or application of a secondary battery in sheet type, though, preferably it should be in stripe form, for instance, of more than about 0.5 mm, preferably 1 to 5 mm thickness, which is relatively thicker compared to conventional leads for a secondary battery. And also as far as material concerns, same as material and shape of leads used for a conventional secondary battery of this kind, metal such as aluminum, aluminum alloy, copper, and nickel is preferred to be used, and preferably the same material as that of the cathode collector, for example, aluminum or aluminum alloy is preferred to be used for the internal cathode lead and the external cathode lead. And as the same material as that of the anode collector, for example, copper and/or nickel is preferred to be used for the internal anode lead and the external anode lead.

As far as material of this connecting means such as a rivet concerns, it is good enough as far as it connects firmly these internal leads and external leads and connects electrically them. For instance, a riveting with solid rivets (hereinafter referred as 'rivets'), full tubular rivets, semi-tubular rivets, split rivets, compression rivets, blind rivets and so on, a fixing means where one of an external lead or an internal lead has a stud that is integral or is fixed to it and at the same time the other lead has a hole to receive the stud to connect and fix them by clamping the top of the stud, or a fixing means by a bolt and a nut are samples of this connecting means.

Further, regarding material of rivets that comprise this connecting means, preferably for connecting an internal cathode lead and an external cathode lead, it is preferred to use aluminum or aluminum alloy, those are the same material that is used for the internal lead. And for connecting an internal anode lead and an external anode lead, it is preferred to use copper and/or nickel, those are the same material that is used for the internal lead. As described here, when aluminum or aluminum alloy which is same as the material used for the cathode collector is used as material of the internal cathode lead, the external cathode lead and the connecting means, and copper and/or nickel which is same as the material used for the anode collector is used as material of the internal anode lead, the external anode lead and the connecting means, it can reduce its contact resistance as well as it can prevent thermal deformation due to their different coefficient of thermal expansion.

Moreover, in the present invention, penetrating holes on an envelope form package, which a connecting means goes through to connect internal leads and external leads are required to be hermetically sealed. There is no restriction to how to seal hermetically these penetrating holes of the envelope form packages, however, for example, sealing parts may be installed between an internal lead and the envelope form package and/or between an external lead and the envelope form package in order to seal the penetrating holes on the envelope form package, which the connecting means goes through, or thickness of the internal layer and/or the external layer around these penetrating holes that this connecting means goes through may be formed thicker than other areas beforehand and when the connecting means connect between the internal leads and the external leads, it may seal the penetrating holes by the thicker area around the penetrating holes.

And, in the case of the above-mentioned sealing parts installation, at least sealing parts installed between the internal lead and the envelope form package are required to be made of synthetic resin that is stable with electrolyte and it is preferred to be made of thermoplastic resin, such as polypropylene, polyethylene, polyimide, polyamide, polyethylene telephthalate, polytetrafluoroethylene, or fluorocarbon polymers, same as or similar to an internal layer of laminated film that comprises the envelope form package.

Regarding a lead outlet structure of a secondary battery in sheet type, position on an envelope form package, where an external lead is provided, has no restriction, as far as it can be installed with the corresponding internal lead.

There is no restriction regarding manufacturing procedure of a secondary battery that has a lead outlet structure of the present invention, however, if a flat rectangle sheet type secondary battery is fabricated with rivets as connecting means, for instance, the following procedure fabricates it easily.

(1) First, connect internal cathode and anode leads to the specified position of an internal electrode pair.

(2) Next, insert the internal electrode pair into an envelope form package, whose three sides are heat-sealed.

(3) Place external leads on the position of the outside of the envelope form package, corresponding to the internal leads and align rivet holes of the internal leads, the external leads and penetrating holes of the envelope form package.

(4) Insert rivets into the rivet holes and the penetrating holes and add force on the rivet axis that sticks out through the rivet holes of the internal leads and the external leads by means of strikes, hydraulic force or air pressure to clamp the tops of the rivets that stick out through the rivet holes.

(5) Seal hermetically by heat-sealing the unsealed side of the envelope form package.

(6) Make a relatively small opening, for example, by cutting one edge of the envelope form package.

(7) Fill the envelope form package with electrolyte through the opening and at the same time seal this opening by heat sealing.

DESCRIPTION OF SIGNS

Figure 1:
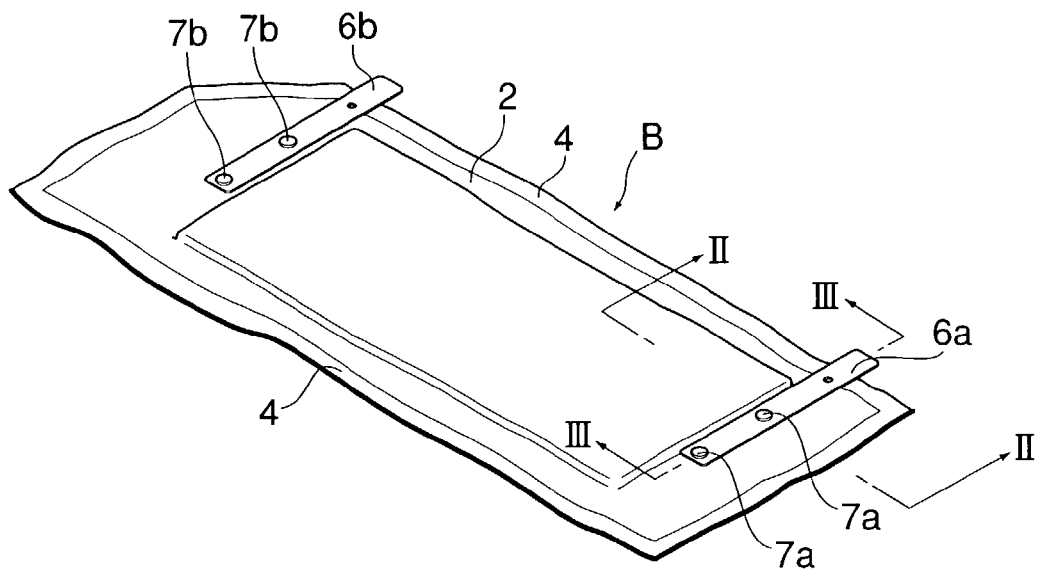
FIG. 1 shows a diagonal diagram of a lithium ion secondary battery in sheet type that has a lead outlet structure related with an embodiment of the present invention.

B-lithium ion secondary battery in sheet type, 1-internal electrode pair, 1$a$-cathode electrode, 1$b$-anode electrode, 1$c$-separator, 2-envelope from package, 4-heat sealed portion, 5$a$, 5$b$-internal leads, 6$a$, 6$b$-external leads, 7$a$, 7$b$-rivet, 8$a$, 8$b$-sealing parts, 9-cathode collector, 10-cathode active material, 11-anode collector, 12-anode active material.

DETAILED DESCRIPTION OF THE PREFERRED EMBODIMENT

A preferred embodiment of the present invention is described below with reference to the drawing which indicates an embodiment sample and a test sample.

<Embodiment Sample>

Figure 2:
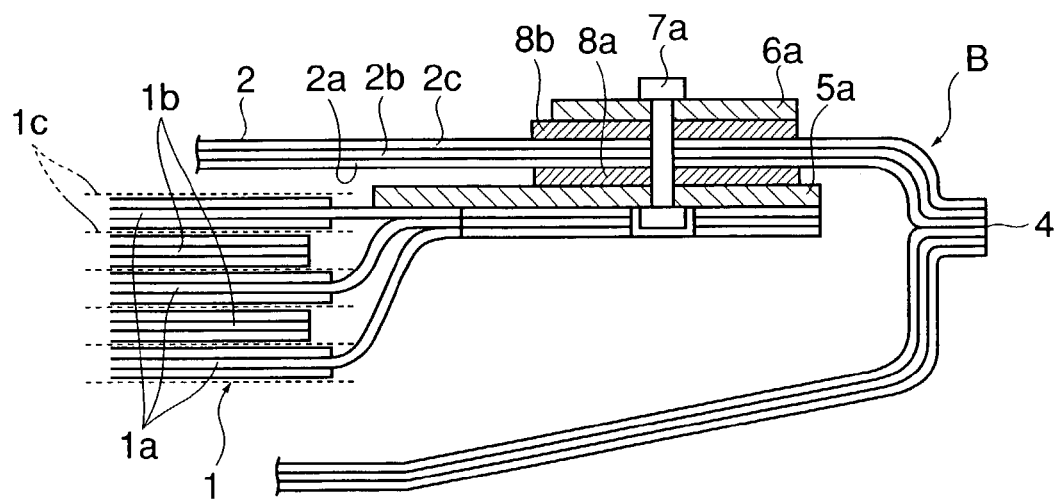
FIG. 2 is a sectional drawing at II—II line in FIG. 1.
Figure 3:
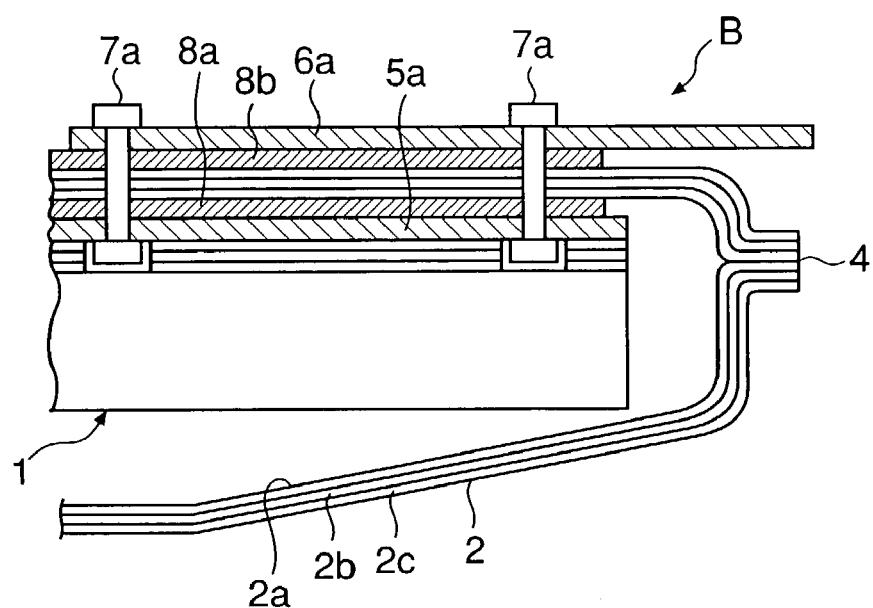
FIG. 3 indicates a sectional drawing at III—III line in FIG. 1.

A lithium ion secondary battery in sheet type, applied the present invention of a lead outlet structure, is indicated in FIGS. 1 to 3. FIGS. 2 and 3 now show a section of cathode leads and the cathode leads are mainly explained below, since structure of anode leads are same as that of the cathode leads.

The present embodiment of a secondary battery in sheet type B comprises; an internal electrode pair in sheet type 1 which is obtained by stacking alternately sheets of cathode electrode 1$a$ and sheets of anode electrode 1$b$ with separator 1$c$ between them, a flexible envelope form package 2 that contains inside hermetically this internal electrode pair 1 and electrolyte (not shown), an internal cathode lead 5$a$ that connects each of cathode electrode sheets 1$a$ of the internal electrode pair 1 inside the envelope form package 2, an internal anode lead (5$b$, not shown) that connects each of anode electrode sheets 1$b$ of the internal electrode pair 1 inside the envelope form package 2, an external cathode lead 6$a$ that are provided on the outside of the above-mentioned envelope 2 form package corresponding to the above-mentioned internal cathode lead 5$a$ with the above-mentioned envelope form package 2 in between, an external anode lead 6$b$ that are provided on the outside of the above-mentioned envelope form package 2, corresponding to the above-mentioned internal anode lead with the above-mentioned envelope form package 2 in between, and a pair of two connecting rivets (total 4 pieces) 7$a$, 7$b$, one side of which is connected to each of the internal leads 5$a$, 5$b$ inside the above-mentioned envelope form package and the other side is connected to each of the external leads 6$a$, 6$b$ on the outside of the envelope form package as well so that each of the internal leads 5$a$, 5$b$ and each of the external leads 6$a$, 6$b$ are electrically connected.

Sealing parts 8$a$ and 8$b$ are in this embodiment installed between each of the internal leads 5$a$, 5$b$ and the envelope form package 2 as well as between each of the external leads 6$a$, 6$b$ and the envelope form package 2 in order to seal the rivet holes on the envelope form package 2, through which the rivets 7$a$, 7$b$ are inserted.

In addition, sign 4 shows the heat sealed portion of the envelope form package 2.

Figure 4:
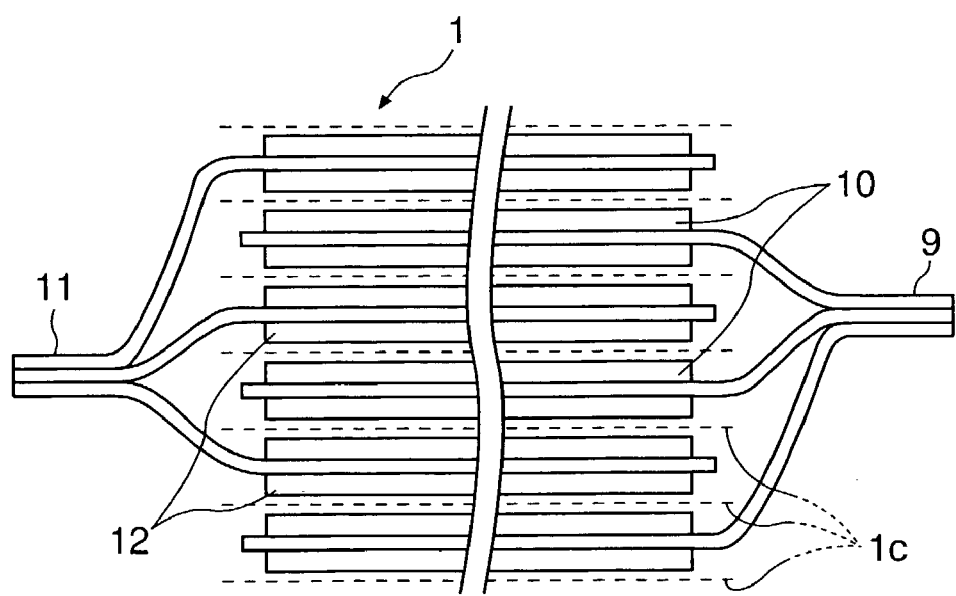
FIG. 4 illustrates an internal electrode pair installed inside an envelope form package in FIG. 1.
Figure 5:
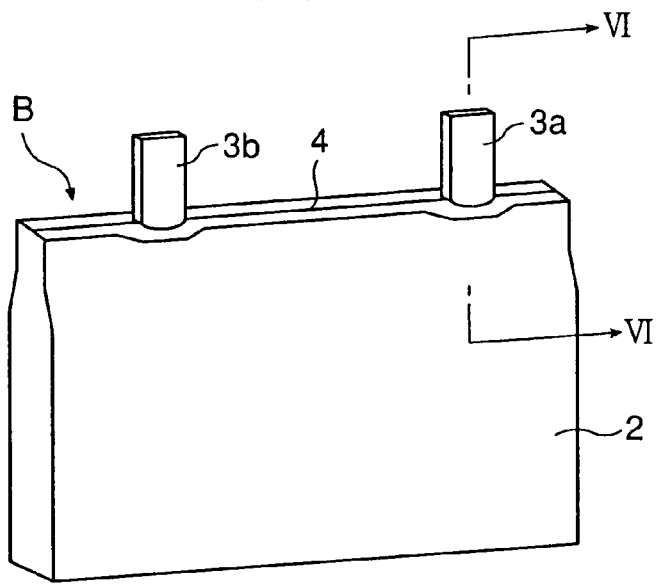
FIG. 5 shows a diagonal diagram of a lithium ion secondary battery in sheet type that has a conventional lead outlet structure.
Figure 6:
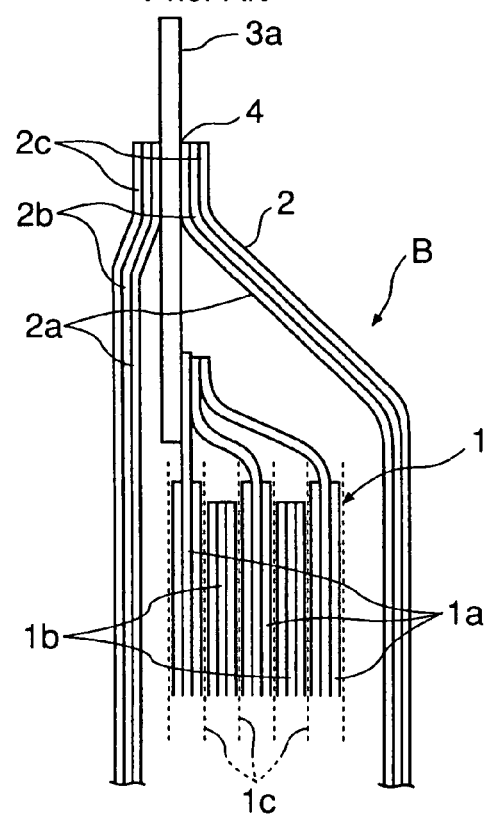
FIG. 6 indicates a sectional drawing at VI—VI line in FIG. 5.

The above mentioned electrode pair 1, as indicated in FIG. 4, consists of cathode electrode 1$a$, which is composed of aluminum cathode collector 9 coated on both sides with cathode active material 10, and anode electrode 1$b$, which is composed of copper anode collector 11 coated on both sides with anode active material 12. In addition, a cathode internal lead 5$a$, a cathode external lead 6$a$ and a rivet 7$a$ that connects them are made of aluminum, same as the above mentioned cathode collector. An anode internal lead 5$b$, an anode external lead 6$b$ and the rivet 7$b$ that connects them are made of copper, same as the above mentioned anode collector Moreover, in this embodiment, the above mentioned envelope form package 2 consists of laminated film of three layers, such as a polyethylene internal layer 2$a$, an aluminum foil middle layer 2$b$ and a nylon external layer 2$c$. A sealing part 8$a$ that is installed between the above mentioned internal leads 5$a$, 5$b$, and the envelope form package 2 are made of polyethylene, same as the internal layer 2$a$ of the envelope form package 2, and a sealing part 8$b$ that is installed between the above mentioned internal leads 6$a$ and 6$b$, and the envelope form package 2 are made of nylon, same as the external layer 2$c$ of the envelope form package 2, In this embodiment of a lithium ion secondary battery in sheet type B, after the rivets 7$a$ and 7$b$ clamp each of the internal leads 5$a$ and 5$b$ and each of the external leads 6$a$ and 6$b$, the envelope form package 2 and the sealing parts 8$a$ and 8$b$ between the internal leads 5$a$, 5$b$ and the external leads 6$a$, 6$b$ are pressed, and then by this mechanism, the holes on the envelope form package through which the rivets 7$a$ and 7$b$ are inserted are sealed hermetically and at the same time the rivets 7$a$ and 7$b$ connect electrically the internal leads 5$a$, 5$b$ and the external leads 6$a$, 6$b$.

<Test Sample>

One hundred lithium ion batteries of 4.2V and 10 Ah in sheet type that is similar form to the embodiment, which comprise an internal electrode pair of 120 mm×300 mm×5 mm in size, internal leads of aluminum or copper of 15 mm×100 mm×1.5 mm in size, external leads of aluminum or copper of 15 mm×100 mm×1.5 mm in size, rivets of aluminum or copper of 4 mm diameter×6 mm in size, an envelope form package that consists of an internal layer of polyethylene of 0.08 mm thickness, an middle layer of aluminum foil of 0.04 mm thickness and an external layer of nylon of 0.03 mm thickness, and electrolyte of mixture of ethylene carbonate (EC) and diethyl carbonate (DEC), were fabricated, were stored at 80 degree C. for one week, and then electrolyte leakage occurrences were counted and the voltages were checked.

As a result, no electrolyte leakage was found and the voltages after the storage were among 4.12 to 4.18V.

Comparison Sample

In addition, one hundred lithium ion batteries of 10 Ah and 4.2V, which have the same composition except that external leads are extended portions of internal leads through heat sealed portion of an envelope form package, were fabricated, were stored at 80 degree C. for one week, and then electrolyte leakage occurrences were counted and the voltages were checked.

As a result, 45 batteries was found to have electrolyte leakage and the voltages after the storage were among 0 to 4.0V.

As the above test sample and comparison sample clearly show, the lithium ion secondary batteries with conventional structure of the comparison sample, have large self-discharge, and about half of the samples have electrolyte leakage. On the contrary, the lithium ion secondary batteries with a structure of the present invention have small self discharge such as about 0.05V and none of the samples has electrolyte leakage.

When a lead outlet structure of this present invention is employed, among secondary batteries in sheet type with an envelope form package as a battery housing, the batteries have light, thin and flexible characteristics and at the same time secondary batteries with relatively large capacity can be achieved. Especially this structure is highly suitable for a lead outlet structure of a lithium ion secondary battery in sheet type with relatively large capacity.

What is claimed is:

1. A secondary battery in sheet type, comprising:
    an internal electrode pair in sheet type being obtained by stacking alternately sheets of cathode electrode and sheets of anode electrode with separator between them;
    a flexible envelope form package having three layer laminated film that consists of an internal layer of thermoplastic resin, a middle layer of metal foil, and an external layer of resin that has good electrical insulation, and containing inside hermetically the internal electrode pair and electrolyte;
    a pair of internal leads being respectively connected with separately each of cathode electrode and each of anode electrode of the internal electrode pair inside the envelope form package;
    a pair of external leads being provided on the outside of the envelope form package corresponding to each of the internal leads with the envelope form package in between;
    a pair of connecting means going through sealed penetrating holes of the envelope form package, one side of which is connected to each of the internal leads inside the envelope form package and the other side is connected to each of the external leads on the outside of the envelope form package as well so that each of the internal leads and each of the external leads are electrically connected;
    a pair of sealing parts being installed between the internal leads and the envelope form package in order to seal the penetrating holes of the envelope form package, and being made of synthetic resin that has chemical resistance; and
    a pair of sealing parts being installed between the external leads and the envelope form package in order to seal the penetrating holes of the envelope form package, and being made of synthetic resin that has good electrical insulation.

2. A secondary battery in sheet type according to claim 1, wherein the internal leads and the external leads, are made of the same material.

3. A secondary battery in sheet type according to claim 1, wherein the connecting means is made of the same material at least as the internal leads.

4. A secondary battery in sheet type according to claim 1, wherein the connecting means is a rivet connecting the internal lead and the corresponding external lead.

5. A secondary battery in sheet type according to claim 1, wherein at least the sealing parts installed between the internal leads and the envelope form package is made of polypropylene, polyethylene or ionomer.

6. A secondary battery in sheet type according to claim 1, wherein the external leads are provided on the same surface of the envelope form package.

7. A secondary battery in sheet type according to claim 1, being a lithium ion secondary battery with large capacity of more than 5 Ah.

* * * * *